United States Patent [19]

Langdon, Jr.

[11] 4,110,831
[45] Aug. 29, 1978

[54] METHOD AND MEANS FOR TRACKING DIGIT SIGNIFICANCE IN ARITHMETIC OPERATIONS EXECUTED ON DECIMAL COMPUTERS

[75] Inventor: Glen George Langdon, Jr., San Jose, Calif.

[73] Assignee: International Business Machines Corporation, Armonk, N.Y.

[21] Appl. No.: 811,214

[22] Filed: Jun. 29, 1977

[51] Int. Cl.² ............................................ G06F 7/50
[52] U.S. Cl. .................................................. 364/745
[58] Field of Search ....................................... 364/745

[56] References Cited

U.S. PATENT DOCUMENTS

| | | | |
|---|---|---|---|
| 3,842,250 | 10/1974 | Anderson | 364/745 |
| 3,885,141 | 5/1975 | Kieburtz | 364/745 |

OTHER PUBLICATIONS

Richards, R. K.; Arithmetic Operations in Digital Computers; Van Nostrand Company, Inc.; N.J. - 1961, pp. 174-176.

*Primary Examiner*—Malcolm A. Morrison
*Assistant Examiner*—Errol A. Krass
*Attorney, Agent, or Firm*—R. Bruce Brodie

[57] ABSTRACT

Method and means are described for the tracking of digit significance upon operands arithmetically combined in a series of binary operations such as addition, subtraction, or shifting in a decimal computer. The digits are decimally encoded in a format having enough excess capacity such that nonsignificant digits are unique. As part of the arithmetic combining of the operand, pairs of digits of like order but possibly mismatched as to significance and by observing a predetermined rounding rule may also cause a carry value to be propagated to a digit position of higher order. In subtraction by complement addition, an additional carry is propagated to a higher order position conditioned upon there being either a local overflow, a nonsignificant subtrahend, or a nonsignificant minuend and a subtrahend less than an amount specified by a rounding rule. Between the two operands, this results in the rounding of the more precise operand to the least significant digit position of the less precise operand. The method and means are applicable to floating point, sign plus magnitude, radix and diminished radix complement number representation forms.

5 Claims, 5 Drawing Figures

METHOD AND MEANS FOR TRACKING DIGIT SIGNIFICANCE IN ARITHMETIC OPERATIONS EXECUTED ON DECIMAL COMPUTERS

BACKGROUND OF THE INVENTION

This invention relates to error reduction in digital computation, and more particularly, to methods and means for preserving the significance of digits of any number resulting from the arithmetic combination of two other numbers (operands) by a decimal machine, i.e. a machine executing arithmetic operations in base ten.

Among the factors affecting computational accuracy are those of significance precision, roundoff, truncation, and representational format. The factors are interrelated. In the following paragraphs, the influence of these upon "digit significance" and upon the invention are briefly considered. *Significance and Precision in Numbers Defined*

In this specification, each number $N_i$ may be positionally denoted by:

$N_i = n_i(n-1)_i(n-2)_i \ldots (n-k)_i \ldots (n-n+1)_i$, where $n_i$ is the digit having the highest order and $(n-n+1)_i$ is the digit of lowest positional order. In this connection, each number is said to possess the attributes of "significance" and "precision".

Although the concept of significant digits is familiar to persons in the technical arts, the specification of which digits in a number are significant is often ambiguous. Indeed, some of the definitions turn on the form of number representation. For example, in floating point arithmetic, it is common to ignore leading zeroes and count any other digit as significant if the error is less than one-half a unit in that radix place. Another definition of significance are those digits or a number beginning with the first nonzero digit on the left and ending with the last nonzero digit on the right. A variation of this latter definition is one which holds significance to be the digits of the number that end with the last digit to the right that is not zero or is a zero that is considered correct. The starting point of this invention, assumes that for a given machine computation system, that significance and nonsignificance can be specified. Relatedly, "precision" is taken to be the degree of discrimination with which a quantity is stated. More particularly, the degree of precision is the "number" of significant digits in a multidigit number.

The False Sense of Digit Significance

If a calculation starts with numbers accurate to six significant digits and performs calculations with reference thereto, then the result may only be accurate to three or four significant digits. As an illustration, consider a sequence of operations that first involves a subtraction of two roughly equal numbers each having $r$ significant digits. The difference may have only $r/2$ or fewer significant digits. If the difference is then multiplied by another number having only $r/2$ significant digits, the product will have only $r/2$ significant digits. However, the $r$ highest order digits may contain a more or less random pattern of values that give the appearance that $r$ digits are significant. If this product is now subtracted from an equal number having $r/2$ significant digits, the difference may have no significant difference at all. Yet, the pattern of values in the result may give the erroneous appearance that $r/2$ digits are significant. A subsequent multiplication with another number may then result in an $r/2$ digit number with the appearance of having $r$ significant digits none of which are actually significant.

The Sources of Loss of Significance

The operations of division and difference are a major cause of errors in significance. For example, let 25.55 be a dividend with four significant digits and let 5.000 be a divisor also possessing four significant digits. The quotient is 5.11. This is significant to only three digits. In subtraction, the difference between two numbers close in value, also causes a loss of significance. Subtracting 9,999.0 (5 significant digits) from 10,001.0 (6 significant digits) yield the result of 2.0 (2 significant digits). This loss of significance is self evidently data-dependent.

Roundoff and Significance

Turning attention to a related topic, "round off" may be described as the deletion of the least significant digit or digits of a number and the adjustment of the retained part in accordance with some rule. Another view of this is that when a quantity cannot be represented exactly by means of a single number, or when the quantity is not known exactly, the procedure used to retain only a specified number of the relatively high order digits and to discard all "low order digits" that would otherwise be needed for a more precise representation of the quantity. The process of deleting the lower order digits and obtaining the desired resultant number is termed "round off".

In the decimal system, one well known "round off" technique is to add the digit five to the highest order digit to be deleted. The carry, if any, resulting from this addition is added to the higher order digits in the conventional way. Thus, when rounding 739.63 to the nearest unit, a 5 is added to the tenths digit to produce 740.13 which becomes the rounded number 740 after the tenths and hundredths digits have been deleted or truncated.

Number Formats

Nunbers for digital computation are represented in diverse format. Among these formats are fixed point, floating point. Negative numbers are represented by radix and diminished radix complement, and sign plus magnitude.

A fixed point format is a positional representation in which a number is represented by a single set of digits, the position of the radix point being fixed with respect to one end of the set, according to some convention. A floating point number, likewise, is a number representation system in which number, as represented by a pair of numerals, equals one of those numerals times a power of an implicit fixed positive integer base where the power is equal to the implicit base raised to the exponent represented by the other numeral. Further, a radix complement is a number obtained by subtracting each digit from one less than its radix then adding one to the least significant digit, and executing all carrys required. Examples frequently used are tens complement in decimal notation, and twos complement in binary notation. Lastly, signed digit representation are positional number representations with a constant integer radix $r$ 3. Both positive and negative digit values are allowed. The individual digits each contain sign information and therefore a special sign digit for the number itself is not required. There are no carry propagation chains because the addition, for example, is totally parallel. This means that any digit of the sum is a function of only two adjacent digits of the operand. Subtraction is performed as a change of sign followed by an addition. The time of any one addition operation is independent of the length of the operand and is equal to the addition time of two digits.

The Prior Art of Significance and Tracking

The pertinent prior art includes Avizienis (I) 1964 Fall Joint Computer Conference Proceedings, pages 653-672; Avizienis (II), Information Processing, North Holland Publishing Company, Amsterdam, 1963, pages 664-668; Metropolis et al, IEEE Transactions on Computers, Volume ED-7, pages 265-267 December 1958; Sterbenz Floating Point Computation, Prentice-Hall, 1974, pages 71-75, 201-205; Gray et al, AFIPS, Volume 16, 1959 EJCC Proceedings, pages 244-248; Frush, U.S. Pat. No. 3,160,857; and Zaffignani, U.S. Pat. No. 3,612,844.

Avizienis (I) and (II) relate to signed digit number representations. Since each digit of significance has a magnitude and a sign associated therewith, this permits parallel processing. In parallel processing, there are no carry propagation chains as is the case with other coded number formats. This absence of carry chains derives from the fact that each resultant digit is the product of only the corresponding digit pair. This fact limits the applicability of the method to signed digit arithmetics.

Avizienis teaches the use of uniquely coded symbols indicative of rank orders of nonsignificant digits $\phi$ for signed digit numbers. He describes a rule for combining a digit pair of the ith rank order where both digits are nonsignificant or are of mixed significance. This is expressed symbolically as $n_i + \phi_i = \phi_i$ and $\phi_i + \phi_i = \phi_i$. This relationship holds that the resultant digit is nonsignificant if at least one of the digits being combined is nonsignificant.

Sterbenz and Gray describe schemes for significance tracking through the use of numbers each having a numerical part and an index of leading zeroes parts. In Gray's scheme, nonsignificant digits are truncated. Of interest is the fact that there is traded off accuracy per se in exchange for a constant indication of how accurate the answer is.

The Frush patent uses the most significant digit position as an index for time expended in serially transferring variable length data from a buffer. Also, Zaffignani uses precoding and positioning to determine the accuracy of keyed data inputing.

SUMMARY OF THE INVENTION

It is the object of this invention to modify prior art method and means for performing arithmetic operations upon a pair of operands whose nonsignificant digits are uniquely encoded such that the more precise one of the two operands is rounded to the least significant digit position of the less precise operand.

It is a further object to devise methods and means for tracking digit significance in the plural bit representations (BCD) of decimal numbers arising out of operations $\otimes$ of addition, subtraction, or shifting in respective of a first $N_i = n_1(n-1)_1(n-2)_1 \ldots (n-k)_1 \ldots$ and a second $N_2 = n_2(n-1)_2(n-1)_2 \ldots (n-k)_2 \ldots$ number as applied, for example, to the arithmetic unit of a conventional decimal computer, the operation yielding a third number $N_3 = n_3(n-1)_3(n-2)_3 \ldots (n-k)_3 \ldots$ The invention is premised on several observations. These observations are:

1. If the digits of decimal numbers are represented in an excess capacity plural bit code, then such excess capacity can be assigned in a form of unique symbols of digit nonsignificance.
2. The logical/arithmetic combination of the corresponding digit $(n-k)$ from two different numbers $(n-k)_1, (n-k)_2$, at least one of which is nonsignificant, then the resulting digit $(n-k)$ is nonsignificant.
3. A carry C may be propagated over j nonsignificant digits from $(n-k)$ to $[n-(k-j)]$ for those operations of subtraction using complementary addition.
4. A carry c may be propagated from $(n-k)$ to $[n-(k-1)]$ if only one of a digit pair is nonsignificant and the significant digit magnitude satisfies a rounding rule such as round if a digit exceeds a threshold b.

The foregoing observations are embodied in a novel method and means. These comprise the steps of encoding each nonsignificant digit in $N_1$ and $N_2$ with a unique plural bit representation (I), i.e. $N_1 = 8939II$, $N_2 = 035III$; and arithmetically combining $N_1$ and $N_2$ such that for each pair of significant digits of the same order $(n-k)_1$, $\otimes (n-k)_2 \otimes$ carry value $[n-(k+1)] = (n-k)_3 +$ carry value. The special symbol, $\otimes$ as previously mentioned is a generalized operator for addition, subtraction, or shifting. Also, for each pair of digits of the same order where at least one digit is nonsignificant, then the resultant digit is nonsignificant. Lastly, for each pair of digits of the same order where one digit is significant and of magnitude determined by a rounding off rule with the other digit being nonsignificant, then a carry value is propagated to the digit position of the next higher order, whereby the more precise one of the two numbers becomes rounded to the least significant digit position of the less precise number.

As an illustration:

```
Let N1=8939II, N2=035III, b=5, for N1+N2=N3
    1 1                          carry
    8939II        N1             Direct Addition
  + 035III        N2
    929III        N3
```

The aforementioned method and means is focused on addition. Indeed, to perform both rounding and subtraction by complementary addition in one pass, there must be invoked a second binary carry signal (AB) when executing this difference operation. The second carry (AB) is invoked upon there being either a local overflow, a nonsignificant subtrahend, or a nonsignificant minuend and a subtrahend less than an amount specified by a rounding rule. Both rounding up and propagation of carries are illustrated in the next example:

Let $N_1$ = minuend M    CB = carry borrow
     $N_2$ = subtrahend S    AB = anti carry borrow
                             R = result

| Direct Subtraction | | Tens Complement Addition | |
|---|---|---|---|
| M: | 9837II | AB: | 1111 |
| S: | 560III | M: | 983III |
| R: | 424III | S': | 439III |
| RADIX-1 | 999999 | CB: | 1111 |
| COMPLEMENT | | | |
| S: | 560III | R: | 424III |

-continued

| Direct Subtraction | Tens Complement Addition |
|---|---|
| S': | 439III |

For both addition and subtraction, the carries (CB or AB) are propagated where indicated over $j$ nonsignificant digits from $(n-k)$ to $(n-k-j)$. Tens complement addition consists of taking a 9's complement of S and "forcing" a carry across the least significant digits.

Unlike the prior art, this invention can advantageously be used with any decimal machine as well as be compatible with the digit pair by digit pair arithmetic processing. By use of this invention, the nonsignificant digits of resultant numbers are automatically preserved. The method and means are compatible with either fixed or floating point number representation.

DESCRIPTION OF THE PREFERRED EMBODIMENT

As previously mentioned, the tracking and preserving of digit significance in a series of binary operations performed on pairs of multidigit operands arises out of the computational concern with errors in arithmetic. It is acknowledged that to assign a unique code to insignificant digits as well as executing addition or subtraction with such numbers has lead in the past to truncation of the result. No rounding was necessarily performed. In this regard, truncation is the chopping of a number at a specified digit whereas rounding is the adjustment of the least significant digits retained in a number. For example, when truncating the decimal number 2.7561 to three digits, the retained number becomes 2.75 whereas the rounded number becomes 2.76.

Figure 1:
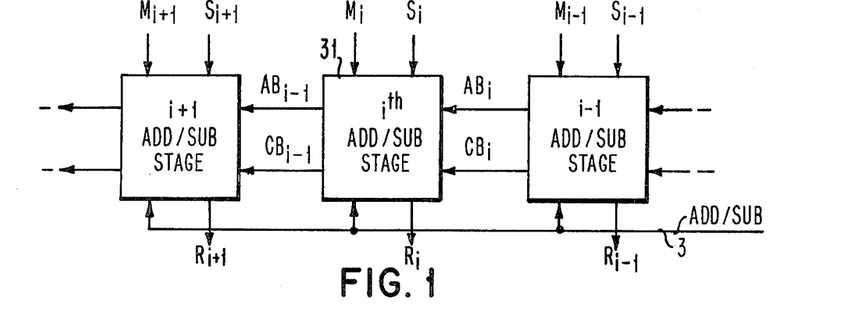
FIG. 1 shows a multistage decimal adder/subtractor unit operable with BCD encoded digits and logically modified to include the invention.

Referring now to FIG. 1, there is shown a multistage decimal adder/subtractor. The operations of addition or subtraction are controlled by application of a respective value 0 or 1 in path 3 applied to the stages simultaneously. Each stage responsive to a pair of operands respectively applied to the M (minuend) and S (subtrahend) input produce a result digit R. In the case of addition, a carry C to a higher order stage may be produced. For subtraction by way of complementary addition up to two carries (CB and AB) may be propagated stage to stage. One example of a decimal adder/subtractor implementing BCD with a carry look ahead feature may be found in Schmookler et al, U.S. Pat. No. 3,629,565.

Figure 2:
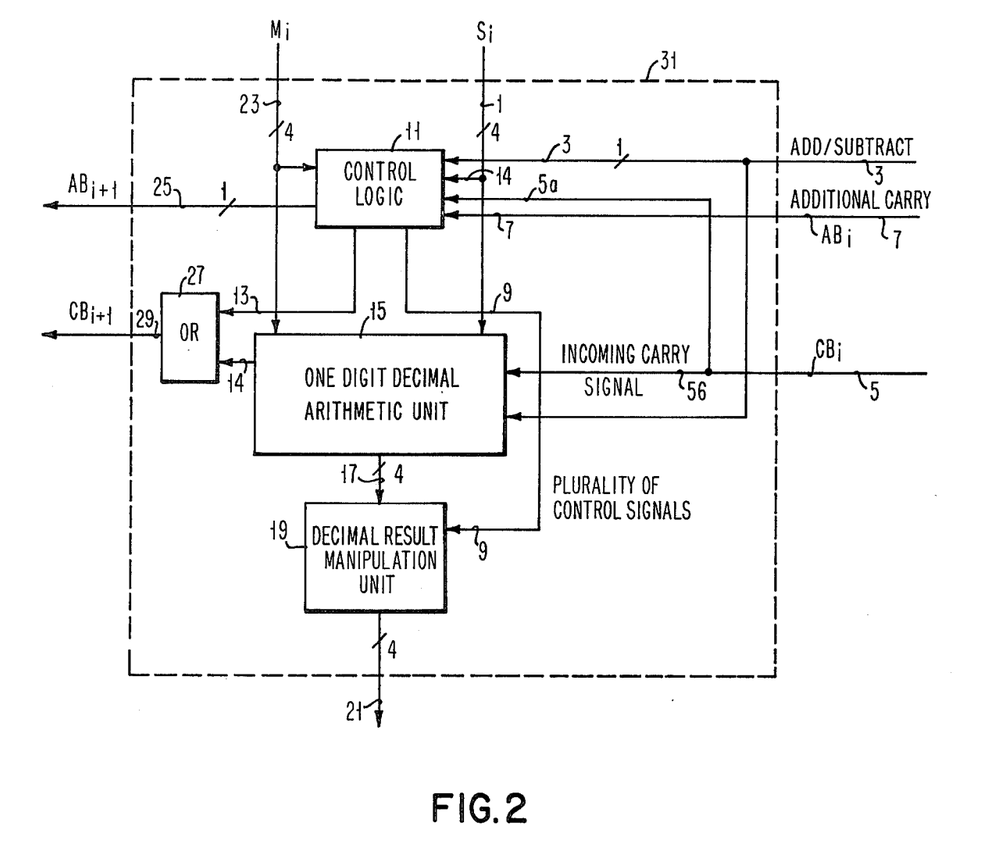
FIG. 2 discloses a block diagram of a single stage of the adder/subtractor.

FIG. 2 discloses a block diagram of a single stage 31 of the decimal adder/subtractor. The stage comprises control logic 11, a one digit decimal arithmetic unit 15, and a decimal result manipulation unit 19. A 1 or 0 signal on path 3 designates whether the bits of the digits respectively appearing on the operand input paths 23 and 1 are to be additively or subtractively combined by AU 15. The arithmetic unit implements a single stage significance arithmetic having a code combination for nonsignificant digits. The AU has the capacity such that the result R, if it is a negative number is represented in one of two complement forms.

The control logic 11 has two decimal digit inputs, 23 and 1. Also, logically labelled, M and S. A signal on path 3 is indicative that the operation performed is either addition (0) or subtraction (1). Logic 11 determines whether M or S digit is nonsignificant (I) and forces the result through the manipulation unit 19. Logic 11 also examines for digit significant mismatch and determines whether it should generate an interstage signal on path 25 or 29. The carry signals ($CB_i$ from the nxt lower order stage) are applied on path 5 to both the control logic 11 and AU 15. However, the additional carry of the $AB_i$ on path 7 from the $i$th-1 stage is applied only to logic 11. For notational consistency, the terms ($i$th+1), $i$th, ($i$th−1) are the same as the corresponding terms $[n-(k-1)]$, $(n-k)$, $[n-(k+1)]$.

It should be observed that the propagation of a carry ($CB_{i+1}$) to the $i$th+1 stage is determined not only by the arithmetic combining of operands in the AU but also by the control logic. This is expressed by paths 13 and 14 from logic 11 and AU respectively terminating in OR-Gate 27 to carry propagation path 29. The additional carry ($AB_{i+1}$) is directly generated by logical evidence on path 25 to the $i$th+1 stage.

The output of the decimal arithmetic unit comprises four bits on path 17 to manipulation unit 19. Although the digits on path 17 may be already in BCD format, a number of circumstances arise where the actual result digits R must be altered. This occurs where there has been a local overflow caused by a pair of carries from the $i$th−1 stage. The manipulation of unit 19 is controlled by logic 11 by signals applied to line 9.

While the invention applies to several conventional number representations provided that the coding of the digits has sufficient excess capacity such that a nonsignificant digit can be explicitly represented, it is apparent that the primary emphasis must be on radix complement representation for decimal numbers. For purposes of understanding, sign magnitude arithmetic defines a "sum operation" is either the addition of two numbers of like sign or as a subtraction between two numbers of unlike sign. Similarly, a "difference operation" is either subtraction with two operands i.e. numbers of like sign or is the addition of two numbers of unlike sign. The difference operation is performable by complementing the second number (subtrahend) and adding to it the first operand (the minuend). The result will be in a complement form if the subtrahend mangitude is larger than the minuend magnitude. This situation is detected by no carry out of the highest order. This necessitates an operation called recomplementation. Recomplementation is accomplished by subtracting the previous result from 0, to give the proper signed magnitude result.

Figure 3:
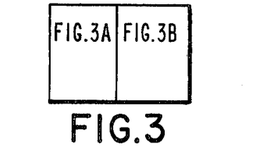
FIG. 3 illustrates the manner in wich FIS. 3a and 3b are to be connected.
Figure 3A:
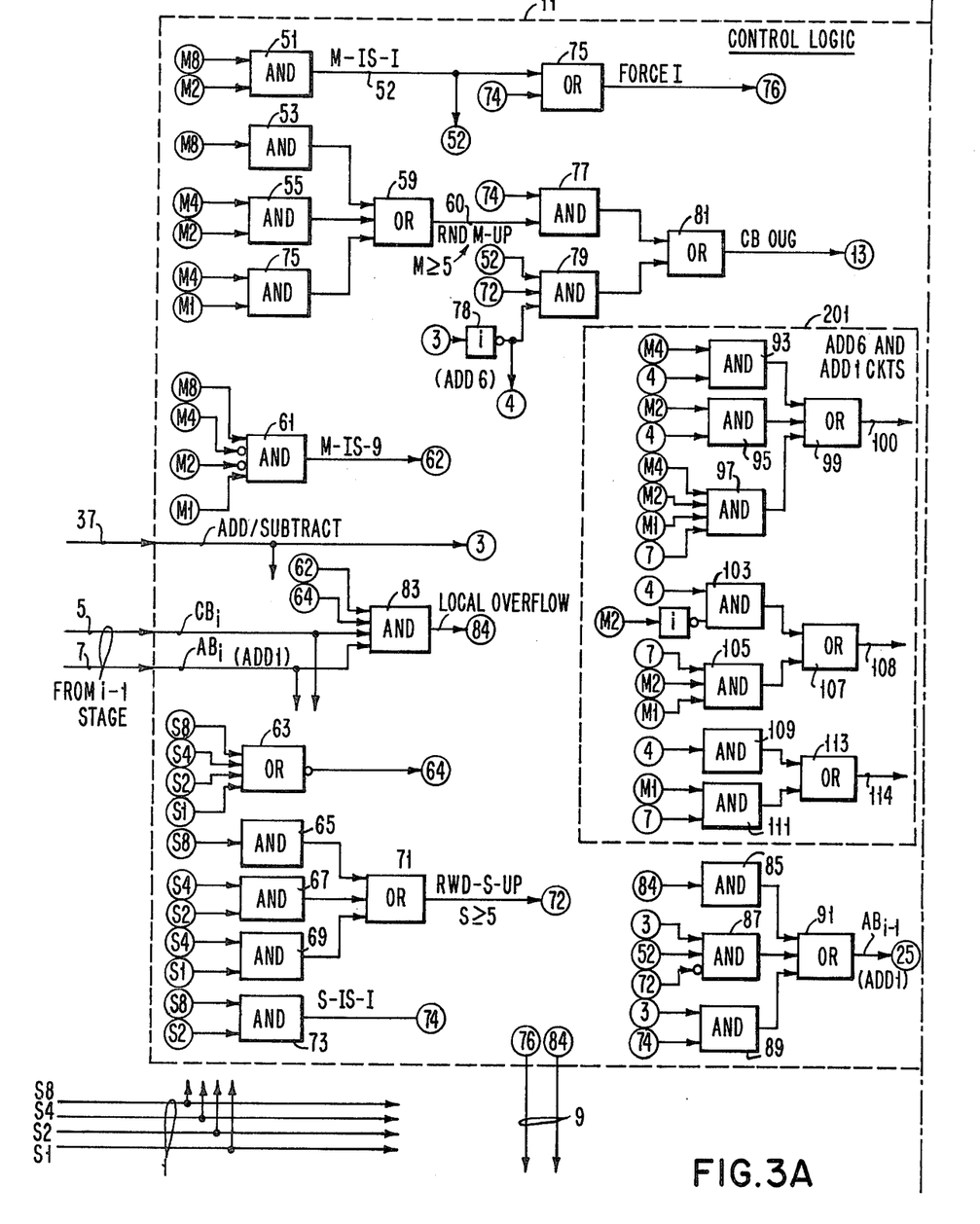
FIGS. 3a and 3b, when arranged as shown in FIG. 3, illustrate circuits for detecting nonsignificant digits I and for determining the significance of the resultant digit. Also illustrated is an addition network modified to permit a special carry increment of an operand. Relatedly, detection circuit for double carry propagation due to "local overflow" are shown.
Figure 3B:
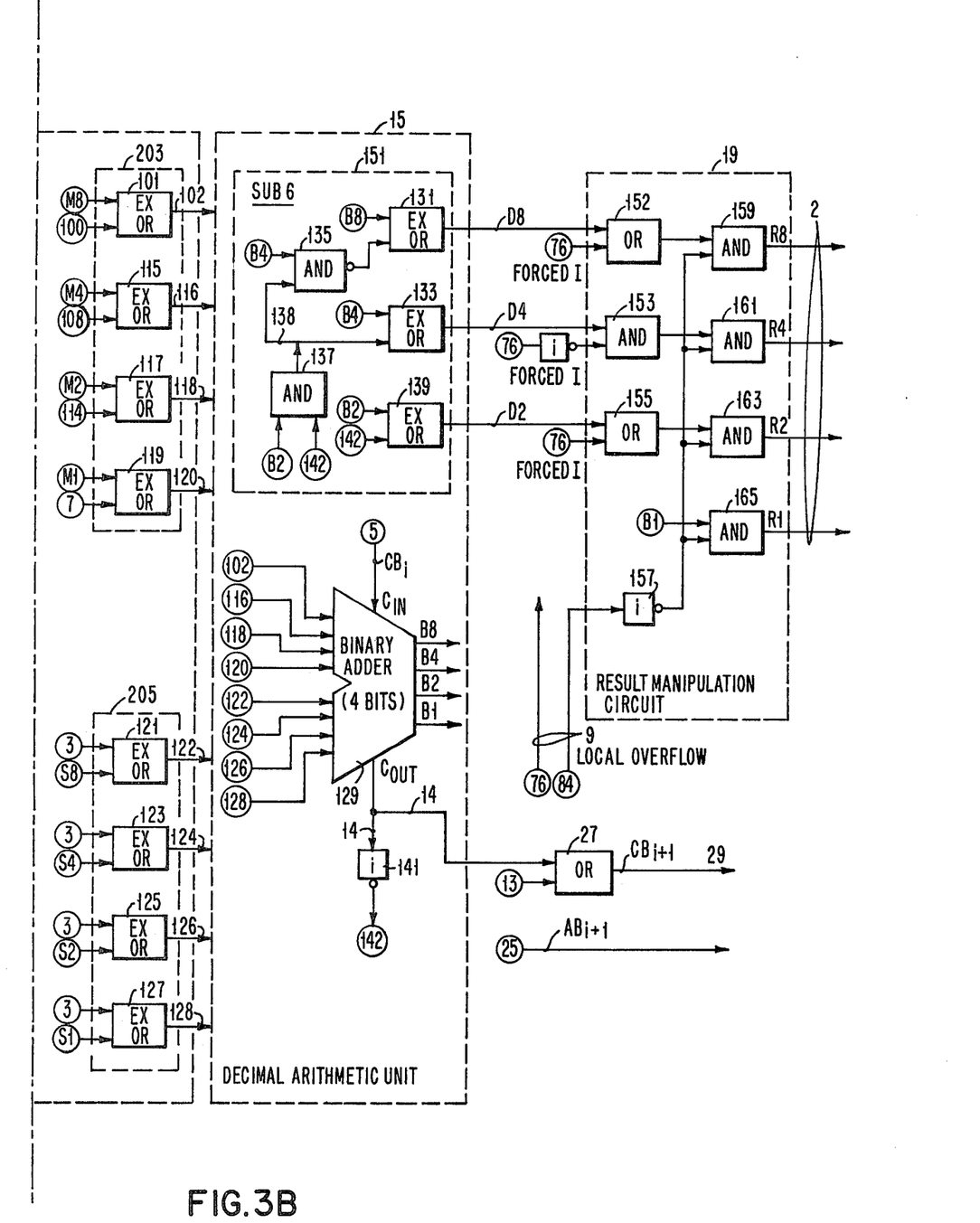

The preferred embodiment referenced in detail in FIG. 3 operates on the BCD encoding where:

0000=0,0001=1, 0010=2, . . . , 1001=9 The bit
combinations "1010" and "1011" are both used to
represent the nonsignificant digit "I".

Because of the similarity between the BCD code and the pure binary number system, the addition of two decimal digits in BCD is very similar to the addition of two binary numbers. However, a problem arises whenever the sum of the two decimal digits plus a possible carry from the next lower position is greater than 9. In particular, if the sum lies in the range 10–15 inclusive, the resulting binary number will be represented by 1010 to 1111, whereas the desired indication for the sum in the BCD code would be 0000 to 0101, respectively, with a decimal carry to the next higher order. Moreover, if the sum lies in the range 16 to 19, the resulting binary number will be in the range 0000 to 0011 with an apparent carry to the base 16 or "sixteens" binary position. The desired indication for the sum in BCD would be 0110 to 1001, respectively again with a decimal carry.

In combining two BCD encoded operands by way of base 16 arithmetic, as in most conventional adders, a correction must be applied to the base 16 result. For example, when the decimal result is greater than 9, digits 10 through 15 must be "skipped over", and a decimal carry signal must be generated. In a conventional arithmetic unit such as in the IBM S/360 Model 40, a "6" is added to one of the BCD digits entering the base 16 adder. If the decimal result is greater than 9, base 16 result is correct as is the carry. However, if the decimal result is 9 or less, the "6" which was added must now be subtracted in order to decimal adjust the base 16 result; this correction may be applied by adding binary 1010 (decimal 10) and subtracting 16 by ignoring the carry.

In decimal subtraction by the addition of 10's complements, the 9's complement of the given decimal number is defined as the number obtained by subtracting each digit of the given number from 9. That is, for example, the nine's complement of 8206 is 9999−8206=1793. To subtract B from another $n$ digit number A, it is sufficient to 9's complement B and then add with δforced" carry. If A is negative, it will appear in 9's complement form. Likewise, B will initially be in 10's complement form if it is negative, but the complementing action and "forced carry" will convert it to true form such that the subtraction of a negative number is equivalent to the addition of a positive number. It is sufficient to point out that the presence or absence of a highest order carry in complement addition can be used to indicate whether the difference is of the same sign as the minuend. Overflow situations can result during subtraction when A or B but not both is negative.

Referring now to FIG. 3, there is shown the circuits for detecting nonsignificant digits I and for determining the significance of the resultant digit. Also shown is an addition network modified to permit a special carry increment of an operand. Relatedly, this figure sets for detection circuits for double carry propogation.

It has been found necessary in implementing the one pass method and means of this invention for BCD and similar number representation systems that a second interstage carry is required and that local overflow can occur, and the propagation of a forced carry during radix complement subtraction or corresponding "end-around-carry" for diminished radix complement subtraction must be also managed over plural nonsignificant digit positions. With these aspects in mind, reference should now be made to FIG. 3 taken together with FIG. 2.

In FIG. 3, the major control blocks of FIG. 2 are shown in dotted outline, namely control logic 11, arithmetic unit 15, manipulation circuit 19. The operands coded in BCD comprise 4 bits applied in parallel on respective conducting paths. Paths 23 comprise 4 conductors labelled M8, M4, M2, and M1 indicative of the weightings associated with the presence of a binary 1 on that particular conductor. Similarly, paths 1 consist of S8, S4, S2, and S1. The M and S designations are of primary importance in subtraction by complement addition so that the minuend and subtrahend may be readily discerned from an input viewpoint. Bits appearing on paths 23 are simultaneously applied to correspondingly designated inputs within several places within logic 11 and to exclusive OR-gates 203 driving the decimal arithmetic unit. Of some interest is the fact that the interstage carry inputs $CB_i$ and $AB_i$ on paths 5 and 7 terminate in AND-gate 83 involved in the generation of a local overflow signal. It should be further observed that the control of addition/subtraction on path 3 is involved in the generation of the antiborrow associated carry $AB_{i+1}$ on path 25 coupled to the next higher order stage. Likewise, the ordinary interstage carry $CB_{i+1}$ is coupled to the next higher stage from OR-gate 27 over path 29.

Of importance is first determining whether the digits are significant or not. This is simply implemented for the M digit by applying bits M8 and M2 to AND-gate 51 while the significance of the S digit is tested by applying bits S8 and S2 to AND-gate 73. Recalling that the nonsignificant digits are previously encoded as either 1010 or 1011, the presence of ones in the second and fourth bit position will cause an indication of nonsignificance on respective paths 52 and 74. M-IS-I or S-IS-I. Now, OR-gate 75 terminates paths 52 and 74 and in turn serves as an input to OR-gates 152 and 155 and AND-gate 153 of result manipulation circuit 19. Following through with this thread, it should be seen that the result digit is also BCD encoded on paths 21 on respective bit lines R8, R4, R2, and R1. These bit lines are driven by counterpart AND-gates 159, 161, 163 and 165. Of interest, is that if at least one of the digits M or S is nonsignificant, then the result digit R will be nonsignificant. A 1 on path 76 indicative either that M or S is nonsignificant causes a 1 to be respectively applied through OR-gates 152 through 155 to counterpart AND-gates 159 and 163. If there is no local overflow, then a 1 is applied to the other of the AND-gate input. This causes a 1 to appear in bit positions R8 and R2. A 0 will appear in bit position R4 caused by the fact that the input from paths 76 becomes inverted thereby disabling AND-gate 153 and AND-gate 161. Result digit R is thus encoded either as 1010 or 1011.

Another circumstance where the result manipulation circuit will alter the ordinary arithmetic output of decimal arithmetic unit 15 is during the presence of a local overflow. A local overflow is the joint occurrence of a 1 on both interstage carry paths 5 and 7 together with the M digit being 9 and the S digit being 0 i.e. not having a 1 in any bit position S8 to S1. This function is implemented by applying the bits of digit M to AND-gate 61. This gate will generate a one out on paths 62 only if the bit combination 1001 is present. Similarly, NOR-gate 63 will impress a 1 on path 64 if none of the bits of digit S are a 1. AND-gate 83 terminates paths 62, 64, 5 and 7 concurrent binary ones on these paths will cause a 1 to appear on path 84. Path 84 is in turn applied to inhibit gate 157 from which a parallel output is applied to AND-gates 159, 161, 163, and 165 of manipulation circuit 19. It follows that a local overflow will disable these AND-gates such that each of the bits in digit R will be 0. Parenthetically, paths 76 and 84 are a portion of the plurality of control signals 9 shown in FIG. 2.

Turning attention again to the subject "rounding", it is recalled that it is the deletion of the least significant digit or digits of a number and the adjustment of the retained part in accordance with some rule. It may be performed upon an operand either prior to or concurrent with that operands involvement in an arithmetic operation. Relatedly, there are three circumstances depending upon the state of the operands in the digit position immediately to the right of the rightmost significant digit position of the result. In the first case, no rounding is required because either the digit position in question is null (the least most significant digit position is the right most position or both operand digits are cap I. In the second case, the least significant digit position of the first operand must receive the carry resulting from the rounding operation on the next lower order digit. This occurs when the second operand digit to the immediate right is either null or I. In the third, the second operand digit of the least significant digit position must be rounded into because the position to the immediate right either the right operand digit is I or no. Parenthetically, the no digit situation may occur in cases two and three when, for floating point addition or subtraction, one operand is right shifted for prenormalization.

The performance of a rounding operation prior to arithmetic combining an operand is unsatisfactory. In single accumulator machine architecture, the more precise operand may be required to undergo change caused by rounding. The second operand is memory and is not expected to change. Alternatively, prior rounding is wasteful of time in that it might require two "passes" through the arithmetic unit.

In this invention, the BCD encoded numbers are applied to a decimal computer arithmetic unit. For each pair of significant digits of the same order:

$(n-k)_1$, $(n-k)_2$ carry value $(n-k)=(n-k)_3+$ carry value $[n-(k-1)]$. Also, for each pair of digits of the same order where at least one digit is nonsignificant, the resultant digit is nonsignificant. This was described in connection with the forced I in FIG. 3.

Where concurrent rounding is performed in a sum operation, then for each pair of digits of the same order, mismatched as to significance, where the significant digit is of magnitude greater than a predetermined amount following a given rounding rule, then a carry value is propagated to the digit position of the next higher order. For concurrent rounding for those operations of subtraction using complementary addition, a carry value over $j$ nonsignificant digits from "$n-k$" to "$n-(k-j)$". For concurrent rounding with the sum operation, consider the following example:

| | Carry | 1 1 | |
|---|---|---|---|
| | M | 8939II | DIRECT ADDITION |
| | S | 035III | |
| | Result R | 929III | |

To emphasize the rule of action, if both operand digits are "I", the result digit is "I". If one operand digit is "I" and the other is not, then the result digit is "I" as before. Given a digit significance mismatch and if the significant digit is greater than 4 according to one rounding rule, then a "carry" is generated and propagated to the next stage.

For concurrent rounding with a difference operation, the rule of action is modified, depending upon whether the left most nonsignificant digit belongs either to the minuend or to the subtrahend. If the left-most I digit is in the minuend and if it is greater than a predetermined amount B then a "borrow" is propagated. This is illustrated in the following example:

| | M | 9413II | DIRECT SUBTRACTION |
|---|---|---|---|
| | S | 080271 | |
| Borrow | CB | 1 1 | using one carry |
| | R | 0610II | |

If the left-most nonsignificant digit is the subtrahend digit, then an interstage signal corresponding to the "polarity" of the minuend is generated if the minuend is to be rounded up. This signal is termed the "antiborrow" signal. Consider the next example:

| Antiborrow | AB | 1 | |
|---|---|---|---|
| | M | 94137I | DIRECT SUBTRACTION |
| | S | 0802II | |
| | CB | 1 | using two carries |
| | R | 8612II | |

It is apparent that two weights of interstage signals are necessary for the difference operation if "concurrent" rounding is to be performed. In the signed digit significance arithmetic such as defined by Avizienis the implementation is straightforward. The Avizienis signed digit arithmetic possesses interstage carries of three values, namely weights plus 1,0, and −1. The rule of action here for concurrent rounding with difference operations employing direct subtraction are:

If $M_i+S_i$ are significant, then (1) $R_i=(M_i+AB_i)-(S_i+CB_i)$ (2) $AB_{i+1}=1$, if $AB_i=1$, $M=9$ and $S=0$ (3) $CB_{i+1}=1$, if $(M_i+AB_i)<(S_i+CB_i)$ If at least one digit of $M+S$ is I, then (1) $R_i=I$ and $CB_{i+1}$, if $M=I$ and $4<S_i\leq9$ (2) $R_i=I$ and $AB_{i+1}=1$, if $4<M\leq9$ and $S=I$ (3) $R_i=I$ and $CB_{i+1}=AB_{i+1}=0$, if $M=S=I$ In the previous paragraphs, the invention has been described in terms of signed magnitude arithmetic. In concurrent rounding with subtraction performed by complement addition such as in tens complement subtraction, the digit by digit complement of the subtrahend is the radix −1 complement. It is added to the minuend with a carry in forced through the $AB_i$ signal. The other carry CB is reserved for the normal carry and for "rounding" up of the minuend. If the subtrahend needs to be "rounded" up instead, this may be accounted for by inhibition of the AB signal. In the following examples of subtraction by way of complementary addition, the radix −1 complement of a subtrahend S will be denoted by S prime. In these cases, both direct and complement subtraction will be illustrated. In this example: if at the ith stage $M_{i=s_i'}=I$ or $S=I$, then $AB_{i+1}=1$

| DIRECT | | | COMPLEMENT | |
|---|---|---|---|---|
| M: | 9837II | AB: | | 11111 |
| S: | 56IIII | M: | | 9837II |
| R: | 42IIII | S': | | 43IIII |
| | | CB: | | 11 |
| | | R: | | 42IIII |
| RADIX-1 | 999999 | | | |
| S: | 56IIII | | | |
| S': | 43IIII | | | |

The next example illustrates the simultaneous need for a dual carry propagation generated by rounding up the minuend digit.

| DIRECT | | | COMPLEMENT |
|---|---|---|---|
| M: | 9837II | AB: | 1111 |
| S: | 560III | M: | 9837II |
| R: | 424III | S': | 439III |
| | | CB: | 1111 |
| | | R: | 424III |
| RADIX-1: | 999999 | | |
| S: | 560III | | |
| S': | 439III | | |

In this last example, the subtrahend had insignificant digits which overlapped significant ones of the minuend. The rounding up of the minuend due to the digit 7 resulted in the first CB signal. In the third digit poisition from the left, it is apparent that both interstage carry signals are necessary if substraction by complement addition is to be performed in only one pass through the adder.

In a previous example, significant digits of M overlapped nonsignificant digits of S. In the instant case, significant digits of S overlap nonsignificant digits of M. Here, the carry AB must still be propagated until the lowest order digit of significance. However, the rounding up of the subtrahend digit has the effect of decrementing the result by one in that digit position. The "rounding up" of the subtrahend digits takes place when its value is greater than the amount specified by some rounding rule. Typically, in base 10 arithmetic, this is when the digit has a value of 5 or more, i.e. 5, 6, 7, 8, or 9. Therefore, the complement digit will be 0, 1, 2, 3, or 4. Thus, if the S prime digit is less than 5 and the M digit is I, the $AB_{i+1}$ signal should be 0 instead of 1. This is shown thusly:

| DIRECT | | | COMPLEMENT |
|---|---|---|---|
| M: | 9837III | AB: | 0101 |
| S: | 5671928 | M: | 9837III |
| R: | 4165III | S': | 4328071 |
| | | CB: | 11 1 |
| RADIX-1 | 9999999 | R: | 4165III |
| S: | 5671928 | | |
| S': | 4328071 | | |

A situation in complementary arithmetic denominated "local overflow" arises where the M digit and S prime digit are 9 and each of the carry signals is 1. The sum for the digit position is "20". This is treated by forcing the result digit R to "0" and making $AB_{i+1}$ and $CB_{i+1}$ both equal to one. This is set forth in the next example:

| DIRECT | | | COMPLEMENT |
|---|---|---|---|
| M: | 1599II | AB: | 11111 |
| S: | 010III | M: | 1599II |
| R: | 150III | S': | 989III |
| | | CB: | 1111 |
| RADIX-1 | 999999 | | |
| S: | 010III | | |
| S': | 989III | | |

Referring again to FIG. 3, the antiborrow interstage carry AB is generated by AND-gates 85, 87, and 89 driving OR-gate 91 onto path 25. In effect, such a carry will be generated if either there is a local overflow from paths 84, the operation is in the subtract mode and S is nonsignificant, or the operation is in the subtract mode and M is nonsignificant and the round S input 72 is 0 which inversion, becomes a 1 at AND-gate 37. For those values of S less 4 or less, the round S up on path 72 will be binary 0. The corresponding value of S prime is 5 or more.

The value of M is also rounded up, i.e. a 1 appears on path 60 from OR-gate 59 when M is 5 or more. It will be observed that AND-gates 53, 55, and 57 drive OR-gate 59 and have their imputs M8, M4, M2, and M1 disposed such that M=to 5 is represented by the output from AND-gate 57. M equal to 6 or 7 passes through AND-gate 55 while the value for M equal to 8 passes through AND-gate 53. The same analysis applies to AND-gate 65, 67, 69 in respect of S and S8, S4, S2, S1.

The AND/OR-gate cluster 77, 79, and 81 define one of the two logical circumstances for generating the other carry signal $CB_{i+1}$. A 1 will appear on path 13 from gate 81 if either S is nonsignificant and M is greater than 5, or M is nonsignificant and S is greater than 5 and the operation is addition. AND-gate 77 correlates with the first condition while AND-gate 79 correlates with the second condition.

So far, the logic of the interstage carries, AB and CB as well as local overflow in connection with FIG. 3 have been described. However, control logic 11 also includes ADD 6 and ADD 1 circuits 201 as well as exclusive OR clusters 203 and 205. The exclusive OR clusters in turn driving binary adder 129 of arithmetic unit 15. The arithmetic unit in addition to the adder includes a subtract 6, responsive to the three most significant digits of adder output 129; namely, B8, B4, B2. The three digit output of circuit 151 D8, D4, D2 are respectively applied to the second input to corresponding gates 152, 153, and 155. The B1 output of binary adder 129 is applied as a second input to AND-gate 169.

In performing a decimal arithmetic with a BCD (8, 4, 2, 1) code, the design is attempting to operate in modulo 10 with a code that is basically modulo 16 using a simple binary adder. The binary adder output B is correct if the sum of the operands is less than 10. However, where B lies in the range 9 B 19, the sum can be corrected by adding +6 thereto. Such a circuit is described in Stone, Introduction to Computer Architecture, Science Research Associates, 1975 at pages 108-111. Unfortunately, Stone's arrangement does not provide a carry out where B lies in the range 9 B 16. Indeed, special logic to detect such a result is needed. In contrast, in the preferred embodiment of this invention for the addition operation, 6 is automatically added to one of the operands (the minuend), a hexadecimal addition is then performed, and a carry signal is then sought after. If the carry signal is not present, i.e. if C out on line 14=0 then the result B is not correct and 6 is subtracted therefrom from circuit 151 producing the corrected number D. If C out equals 21 then B applied to circuit 151 is not changed and passes through unaltered to the result manipulation circuit 19.

Turning attention to the ADD 6 and ADD 1 circuits 201, account should be taken of the fact that the ADD 1 circuit is mutually exclusive of the ADD 6 circuit. In this regard, the addition of +1 of the minuend occurs only during a subtraction operation. The logic for performing the addition of +6 to the minuend during addition is controlled by 3 AND/OR clusters. These clusters are respectively AND-gates 93, 95, 97 and OR-gate 99; AND-gates 103, 105 and OR-gate 107 and AND-gates 109, 111, and OR-gate 113. The output 100 of the first cluster serves as a first input to exclusive OR gate 101. The output 108 of the second cluster serves as a first input to exclusive OR-gate 115 while the output 114 of the third cluster serves as a first input to exclusive OR gate 117.

An addition operation is called for by a 0 on path 3 which is inverted to a 1 through inverter 78 on path 4. The path 4 input conditions AND-gates 93, 95, 103, and 109. A 1 will appear on output 100 in the presence of addition if either bits M4 or M2 are 1, or if M4, M2, M1 are 1 and S is nonsignificant. Similarly, output 108 is 1 either when S is nonsignificant and M2 and M1 are 1 or in the presence of addition and M2 is 0. Likewise, output 114 is 1 either in the presence of addition, or when M1 is 1 and S is nonsignificant.

The outputs 102, 116, 118, and 120 from exclusive OR-gate cluster 203 serve as inputs to binary adder 123. Also, the outputs 122, 124, 126, and 128 from second OR-gate cluster 205 serve as another set of inputs to adder 129.

Functionally, exclusive OR-gate cluster 203 passes M+6 to the binary adder 129 when addition is defined on path 3. However, M is passed through directly, since inputs 100, 108, and 114 are 0. This in turn disables the exclusive OR gates 101, 115, and 117.

The second exclusive OR-gate cluster 205 passes each of the bits of the subtrahend directly to binary adder 129 when addition is defined on path 3. Recall that addition is represented as a 0 on path 3 thereby disabling paths 121, 123, 125, and 127. However, during subtraction, input 3 is a binary 1 upon the concurrent application of the subtrahend digits S8 to OR-gate 121 S4 to OR-gate 123, S2 to OR-gate 125 or S1 to OR-gate 127. This has the logical equivalence of performing a fifteens complement. This is further equivalent to the performance of a nines complement and the addition of +6.

As described before, the subtract 6 circuit 151 diminishes the output of binary adder 129 by the magnitude of 6 when C out equals 0 on path 14. This is accomplished by exclusive OR-gates 131, 133, and 139. Respectively terminating as a first input, B8, B4, and B2. Now, when C out equals 0 it becomes a 1 on path 142 by the action of inverter 141. Path 142 serves as an input to exclusive OR-gate 139 and AND-gate 137. At the same time that C out equals 0, if B lies in the range $9 < B < 16$, then B6 is 1 and either B4 or B2 or both are 1. When B2 is 1 and B4 is 0, then a 1 is passed through AND-gate 138 to exclusive OR-gate 133 resulting in a 1 on B4. If B4 and B2 are both 1 then AND-not gate 135 sets exclusive OR-gate 131 to pass B8 such that D8 is one and D4 and D2 are 0. In all of these operations, it should be recalled that the exclusive OR-gate generates a 1 output only upon a mismatch of its input.

The outputs D8, D4, and D4 of circuit 151 are passed through to counterpart AND-gates 159, 161, and 163 in the absence of a forced carry through counterpart gates 152, 153, 155. The least significant digit output B1 from the binary adder is directly applied to AND-gate 165. The resultant digit bits R8, R4, R2, R1 correspond in the absence of local overflow to D8, D4, D2, and D1.

To illustrate the unit operations, assume the following:
Given
   $M = M8M4M2M1 = I = 1010$, $CB_i = 0$
   $S = S8S4S3S1 = 6 = 0110$, $AB_i = 0$
then for
   $M+S$, $R=I$, $C_{i+1}=1$
whether
   $M=I$ and $S=6$ or
   $M=6$ and $S=I$ Applying the I digit 1010 to the minuend and the 6 digit 0110 to the subtrahend, it follows that because M8 and M2 are 1 and applied to AND-gate 51, then M is detected as I then I is forced through OR-gate 75 path 76 onto the input in manipulation circuit 19 such that a 1 passes through OR gate 152. Since there is no local overflow a zero appears on path 84 and is inverted to a 1 by inverter 157 again in circuit 19. This means that a 1 is gated through AND-gate 159 to R8. AND-gates 153 and 161 are disabled by the fact that the 76 input to AND-gate 153 is inverted to 0. This means that R4 is 0. The R2 is 1 due to the fact that the 1 representing the forced I is passed through OR-gate 155 and AND-gate 163. Since I has been defined as 1010 or 1011 and the actual bit value of R1 is immaterial. Since S equals 0110, then bits S4 and S2 are both 1 causing a 1 to be propagated through AND-gate 67, OR gate 71 and round S up on path 72. This is inverted to 0 inhibiting AND-gates 87. Since there is no local overflow 84, nothing can pass through AND-gate 85. In view of the fact that an additional operation, i.e. 0 is specified on path 3, AND-gate 89 is disabled. This means that there is no carry $AB_{i+1}$ on path 25.

With regard to the overflow problem, it is observed that although a 1 is passed through NOR-gate 63 to path 64 and path 64 terminates in AND-gate 83, nevertheless, gate 83 remains disabled because $CB_i$ and $AB_i$ remain 0. The subtrahend digits are also applied to exclusive OR-gate cluster 205 which selectively inverts the subtrahend bits during subtraction. The gates being disabled during addition i.e. input 3 is 0 on gates 121, 123, 125, and 127 then the subtrahend digits are passed right through to the binary adder unchanged. This means a 0 on path 122, a 1 on path 124, a 1 on path 126 and a 0 on path 128.

In contrast, the exclusive OR-gate cluster 203 has some of its exclusive OR-gates turned on. In particular, gates 101 and 117. This means that on paths 100 and 114 there appears a binary 1 while on path 108, there appears a 0. A binary 1 appears on path 100 because the M2 bit is a 1 and the path 4 bit is a 1. Passing through AND-gate 95 and OR-gate 99. Path 108 has a 0 thereon because AND-gate 103 is disabled by the inversion of the M2 bit from a 1 to a 0. AND-gate 105 is disabled because S is significant hence path 7 input is 0. Remembering that when addition is called for, there appears a 0 on path 3. This is changed to a 1 on path 4 by inverter 78. The 1 on path 4 drives AND-gate 109 and OR-gate 113 providing a 1 on path 114. Since the inputs to each of the exclusive OR-gates in cluster 203 match then the output is 0 on each of the respective paths 102, 116, 118, and 120.

Having defined the inputs to binary adder 129, it follows that C out on path 14 is 0. Since the value on path 13 is 0, then a 0 is propagated through OR-gate 27 onto path 29. This analysis may be replicated for conditions of interstage carries and local overflow.

Having thus described in detail a preferred embodiment of the inventive system, a person skilled in the art will be able to modify certain of the structure and steps which have been disclosed and to substitute equivalent elements for those illustrated while continuing to practice the invention. It is, therefore, intended that all such modifications and substitutions be covered as they are embraced within the spirit and scope of the appended claims.

What is claimed is:

1. In combination with a multistage decimal adder/subtractor, an apparatus for rounding up the more precise one of two BCD encoded numbers to the least significant digit position of the less precise number, pairs of digits of like order being applied to corresponding stages, nonsignificant digits I being uniquely coded, said apparatus comprising:

means for comparing the significance of the digits of each pair and for causing the resultant digit of the corresponding adder/subtractor stage to be changed to I if at least one digit of the pair was of value I;

means for causing a first carry to be applied to the adder/subtractor stage next in higher order than a given stage when one digit of the pair applied to the given stage is significant and has a value $>b$, $b$ being sent by a rounding rule, the other digit having the value I; and means for causing a second carry to be applied to the stage next in higher order than the given stage when the digit pair values and carries incident upon the given stage exceed an amount K and for causing the corresponding resultant digit to be changed to 0, said means including means also for generating a second carry in the event the given stage subtracts one digit from another and either the minuend digit has value I and the subtrahend digit $<b$ or the subtrahend digit has value I.

2. A machine implementable method for tracking digit significance in plural bit representations (BCD) of decimal numbers arising out of operations of addition or subtraction of a first $N_1=n_1 \, (n-1)_1 \, (n-2)_1 \ldots (n-k)_1 \ldots$ and a second $N_2=n_2 \, (n-1)_2 \, (n-2)_2 \ldots (n-k)_2 \ldots$ number as applied to an arithmetic unit, said operations yielding a third number $N_3=n_3 \, (n-1)_3 \, (n-2)_3 \ldots (n-k)_3 \ldots$; the method comprises the steps of:

encoding each significant digit in $N_1$ and $N_2$ in an excess capacity plural bit representation and further encoding each nonsignificant digit in $N_1$ and $N_2$ with a unique plural bit representation (I), applying said encoded digits of the numbers to the arithmetic unit; and combining the numbers $N_1$ and $N_2$ such that:

for each pair of encoded significant digits of the same order $(n-k)_1 \otimes (n-k)_2 \otimes$ carry value $[n-(k+1)]=(n-k)_3+$ a first carry signal (CB) to the arithmetic unit digit position of next higher order $[n-(k-1)]$ $\otimes$ represents the generalized operation of addition or subtraction;

for each pair of encoded digits of the same order where at least one digit is nonsignificant, then the resultant digit is nonsignificant, that is, if either $(n-k)_1=I$ or $(n-k)_2=I$, then $(n-k)_3=I$;

for each pair of encoded digits of the same order where one digit is nonsignificant and the other digit is significant and of magnitude greater than an amount $b$ set by reference to a rounding rule, then the first carry signal (CB) is propagated to the arithmetic unit digit position of the next higher order;

whereby the more precise one of the two numbers becomes rounded to the least significant digit position of the less precise number.

3. A machine implementable method according to claim 2, wherein given the event that the operation to be performed by the arithmetic unit upon the numbers constitutes subtraction using complement addition, then the method comprises the further steps of:

converting the encoded significant digits of the subtrahend number into a radix complement form prior to the application of the numbers to the arithmetic unit; and arithmetically combining the numbers such that for each pair of encoded digits where either the minuend digit $(n-k)_1$ lies in the range $b<(n-k)_1 \leq \text{radix}-1$ and the complemented subtrahend digit $(n-k)_2=I$, or where $(n-k)_1=(n-k)_2=I$, a second carry signal (AB) is propagated to the arithmetic unit digit position of next higher order $[n-(k-1)]$.

4. In combination with a multi-stage decimal adder/subtractor, an apparatus for rounding up the more precise one of two BCD encoded numbers to the least significant digit position of the less precise number, pairs of digits of like order being applied to corresponding stages, nonsignificant digits I being uniquely coded, said apparatus comprising multiple stages arranged in number digit position order, each stage includes:

first means for propagating carry signals to the stage of next higher order and for receiving carry signals from the stage of next lower order;

output indicating means;

second means coupling said first means and responsive to received carry signals and to pairs of encoded digits for generating a sum digit and other carry signals;

third means responsive to a control signal for selectively passing either the sum digit, I, or 0 to the output means:

fourth means coupling the first means and also responsive to the encoded digits for ascertaining nonsignificance of one or both, said fourth means including means for generating control signals indicative of passing I to the output means upon detecting at least one digit coded as I, for passing 0 upon detecting that both digits are equal to the radix-1 and that the received carries have a value which when summed with the digits results in local overflow, and for passing the sum digit otherwise.

5. An apparatus for tracking decimal digit significance within operands arithmetically combined in a series of operations involving a decimal adder/subtractor, each of the digits being decimally encoded in a format having enough excess capacity such that nonsignificant digits are uniquely coded, said apparatus comprising:

means for testing digits of like order but mismatched as to significance and observing a rounding rule for the significant one of any given digit pair for causing a first carry to be applied to the adder/subtractor digit position of next higher order;

means for performing subtraction by complement addition on the operands and including means for causing a second carry to be applied to the $[n-(k-1)]$ adder/subtractor digit position conditioned upon there being the digits pair applied to the $(n-k)$ position either a local overflow, a nonsignificant subtrahend digit, or a nonsignificant minuend digit and a subtrahend digit less than an amount determined by the rounding rule; and means for changing the resultant digit of each adder/subtractor digit position such that upon at least one digit being nonsignificant in any given pair, the resultant digit is nonsignificant and further in the event there being local overflow, the resultant digit is zero.

* * * * *